(12) United States Patent
Stotts

(10) Patent No.: US 8,521,542 B1
(45) Date of Patent: Aug. 27, 2013

(54) SYSTEMS AND METHODS FOR CLASSIFYING ACCOUNT DATA USING ARTIFICIAL NEURAL NETWORKS

(75) Inventor: Benjamin Hunter Stotts, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 407 days.

(21) Appl. No.: 11/753,517

(22) Filed: May 24, 2007

(51) Int. Cl.
*G06Q 10/00* (2012.01)
*G06E 1/00* (2006.01)

(52) U.S. Cl.
USPC .................................................. 705/1; 706/15

(58) Field of Classification Search
USPC .............................................. 706/15; 705/1
See application file for complete search history.

(56) References Cited

U.S. PATENT DOCUMENTS

| | | | |
|---|---|---|---|
| 5,809,490 | A | 9/1998 | Guiver et al. |
| 5,933,818 | A | 8/1999 | Kasravi et al. |
| 6,012,058 | A | 1/2000 | Fayyad et al. |
| 6,035,057 | A | 3/2000 | Hoffman |
| 6,119,103 | A | 9/2000 | Basch et al. |
| 6,278,799 | B1 * | 8/2001 | Hoffman ..................... 382/159 |
| 6,321,205 | B1 | 11/2001 | Eder |
| 6,400,996 | B1 | 6/2002 | Hoffberg et al. |
| 6,430,539 | B1 | 8/2002 | Lazarus et al. |
| 6,629,081 | B1 | 9/2003 | Cornelius et al. |
| 6,658,393 | B1 | 12/2003 | Basch et al. |
| 6,839,682 | B1 | 1/2005 | Blume et al. |
| 2003/0158828 | A1 * | 8/2003 | Ikeda et al. ..................... 706/12 |
| 2004/0034568 | A1 * | 2/2004 | Sone .............................. 705/26 |
| 2005/0021489 | A1 | 1/2005 | MacLennan et al. |
| 2005/0043961 | A1 * | 2/2005 | Torres et al. ..................... 705/1 |
| 2005/0288954 | A1 | 12/2005 | McCarthy et al. |
| 2006/0236395 | A1 | 10/2006 | Barker et al. |

OTHER PUBLICATIONS

Article Title: "Industry-specific cycles and companies' financial performance comparison using self-organizing maps", Authors: Lansiluoto, Aapo; Eklund, Tomas; Back, Barbro; Vanharanta, Hannu; Visa, Ari, Published Date: 2004.*
Caudill, Steven B; Ayuso, Mercedes; Guillen, Montserrat; "Fraud Detection using a multinominal Logit Model with Missing Information"; Dec. 2005, Journal of Risk & Insurance, v72n4; ISSN: 0022-4367.*
PR_Newswire, "CheckFree Introduces Expanding Portfolio of Online Financial Services Solutions", Nov. 14, 2006, Supplier No. 154393711.*

(Continued)

*Primary Examiner* — Edward Chang
(74) *Attorney, Agent, or Firm* — Brooks, Cameron & Huebsch, PLLC

(57) ABSTRACT

Systems, methods, and articles are provided for classifying account data using artificial neural networks. An example embodiment may include receiving account holder data for a plurality of account holders, identifying through computer automated operations relationships between the plurality of account holders and the account holder data, and analyzing the account holder data of the plurality of account holders to create one or more classifications based on the relationships between the plurality of account holders and the account holder data. Another example embodiment may include classifying financial account holder data for a plurality of financial account holders using a Kohonen network, and displaying a graphical representation of the classified financial account holder data to visualize one or more relationships between plurality of financial account holders and the financial account holder data. Other embodiments may be described and claimed.

18 Claims, 3 Drawing Sheets

(56) References Cited

OTHER PUBLICATIONS

"Electronic Textbook StatSoft", [online]. © StatSoft, Inc., 1984-2004. [observed on May 24, 2007]. Retrieved from the Internet: <URL: http://www.statsoft.com/textbook/gloss.html>, 28 pgs.

"Generation5—Applying Kohonen Networks", [online]. © James Matthews, 2004. [retrieved on May 24, 2007]. Retrieved from the Internet: <URL: http://www.generation5.org/content/2004/kohonenapplications.asp>, 4 pgs.

"Generation5—Self-Organizing Nets", [online]. © James Matthews, 2004. [retrieved on May 24, 2007]. Retrieved from the Internet: <URL: http://www.generation5.org/content/1999/selforganize.asp>, 4 pgs.

"SOM tutorial part 1—ai-junkie—Adjusting the Weights", [online]. [retrieved on May 24, 2007]. Retrieved from the Internet: <URL: http://www.ai-junkie.com/ann/som/som4.html>, 4 pgs.

"SOM tutorial part 1—ai-junkie—Determining the Best Matching Unit's Local Neighbourhood", [online]. [retrieved on May 24, 2007]. Retrieved from the Internet: <http://www.ai-junkie.com/ann/som/som3.html>, 3 pgs.

"SOM tutorial part 1—ai-junkie—Kohonen's Self Organizing Feature Maps", [online]. [retrieved on May 24, 2007]. Retrieved from the Internet: <URL: http://www.ai-junkie.com/ann/som/som1.html>, 4 pgs.

"SOM tutorial part 1—ai-junkie—Learning Algorithm Overview", [online]. [retrieved on May 24, 2007]. Retrieved from the Internet: <URL: http://www.ai-junkie.com/ann/som/som2.html>, 3 pgs.

"SOM tutorial part 1—ai-junkie—Applications of SOMs", [online]. [retrieved on May 24, 2007]. Retrieved from the Internet: <URL: http://www.ai-junkie.com/ann/som/som5.html>, 3 pgs.

Smith, K. A., et al., "Neural Networks in Business: Techniques and Applications for the Operations Researcher", *Computers & Operations Research*, 27, (2000), 1023-1044.

West, D., "Neural Network Credit Scoring Models", *Computers & Operations Research*, 27, (2000), 1131-1152.

Jensen, H. L., "Using Neural Networks for Credit Scoring", *Managerial Finance*, 18, (1992), 15-26.

\* cited by examiner

SYSTEMS AND METHODS FOR CLASSIFYING ACCOUNT DATA USING ARTIFICIAL NEURAL NETWORKS

CROSS REFERENCES

This application is related to U.S. application titled "SYSTEMS AND METHODS FOR CLASSIFYING ACCOUNT DATA USING ARTIFICIAL NEURAL NETWORKS" Ser. No. 11/753,509 filed on even date herewith. This application is also related to U.S. application titled "SYSTEMS AND METHODS FOR CLASSIFYING ACCOUNT DATA USING ARTIFICIAL NEURAL NETWORKS" Ser. No. 11/753,546 filed on even date herewith.

TECHNICAL FIELD

Various embodiments described herein relate to computerized systems generally, and more particularly to systems and methods for classifying account data using artificial neural networks.

BACKGROUND

Artificial neural networks may be categorized in terms of their corresponding training algorithms. In a supervised network, training data is provided during a training phase. The training data consists of many pairs of known input/output patterns. In an unsupervised network, data consists of input data only.

One example of an unsupervised network is a Kohonen neural network. This means that the Kohonen network is presented with data, but the correct output that corresponds to that data is not specified. When a pattern of input data is presented to a Kohonen network one of the output neurons "fires" (i.e., is selected as a "winner"). This "firing" neuron is the output from the Kohonen network for that particular input pattern. Often these "firing" neurons represent groups in the data that is presented to the Kohonen network.

SUMMARY

Systems, methods, and articles are provided for classifying account data using artificial neural networks.

An example embodiment may include receiving account holder data for a plurality of account holders, identifying through computer automated operations relationships between the plurality of account holders and the account holder data, and analyzing the account holder data of the plurality of account holders to create one or more classifications based on the relationships between the plurality of account holders and the account holder data.

Another example embodiment may include classifying financial account holder data for a plurality of financial account holders using a Kohonen network, and displaying a graphical representation of the classified financial account holder data to visualize one or more relationships between the plurality of financial account holders and the financial account holder data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Some embodiments of the invention may include systems, methods, and articles for classifying account data using artificial neural networks.

The following detailed description is divided into three sections. The first section presents a system overview of the inventive subject matter. The second section provides methods of using example embodiments of the inventive subject matter. The third section describes the hardware and the operating environment in conjunction with which embodiments can be practiced.

System Level Overview.

Figure 1:
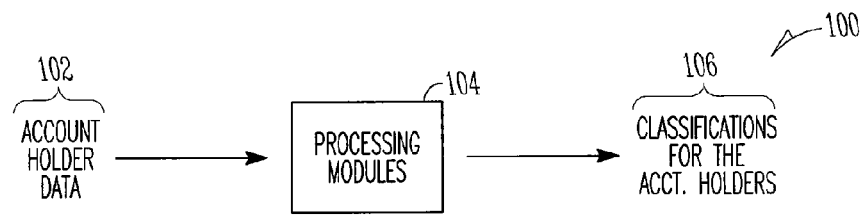
FIG. 1 is a block diagram of an example system according to various embodiments.

FIG. 1 comprises a block diagram of a system 100 for classifying account holders. The system 100 comprises inputs 102, processing modules 104, and outputs 106.

Input 102 represent account holder data. The account holder data may be any data representing various characteristics of the relationship between the card holder and the card itself. In some embodiments, the various characteristics include, but are not limited to, characteristics of a credit card holder, characteristics of the credit card history, and characteristics of spending on the credit card account.

Characteristics of a credit card holder may include, but are not limited to, demographic information such as age, job class, career, whether a person is a member of a particular organization, whether a person is a member of a particular program/financial institution, spending habits, credit limit, and the like.

Characteristics of the card history may include, but are not limited to, how many times has the person or how many times has the card been charged a finance charge, how long has the card been issued, has there always been a balance on the card throughout the entire time it's been issued, and so on.

Characteristics of spending on the account may include, but are not limited to, what types of things did the person buy with the card (e.g., Did he buy typically CDs? Did he buy DVDs? Did he buy food? Did he buy typically electronics?).

The processing modules 104 analyze the account holder data of the plurality of account holders to create one or more classifications of the account holders based on the relationships between the plurality of account holders and the account holder data. The processing modules are described in more detail with respect to FIG. 2.

The outputs 106 represent the classifications of the account holders. According to example embodiments, the account holders with similar characteristics are classified together in the output. In some embodiments, the volume of account holder data is such that the relationships between the plurality of account holders and the account holder data may not have been possible to identify through just a manual review of the inputs.

Consider for a simple example with two different credit card holders. The first credit card holder pays finance charges every month because he does not pay off his balance. The second credit card holder never incurs a finance charge because he always pays his entire balance every month. The processing modules 104 classify people who are similar to this first credit card holder together in the output 106. The processing modules 104 classify people who are similar to the second credit card holder in a different portion of the output. The distribution of credit card holders across the output classifications is such that credit card holders with similar characteristics are grouped together in the various portions of the output. Therefore, a useful result of the outputs 106 is the classification of account holders based on identification of their common characteristics.

Figure 2:
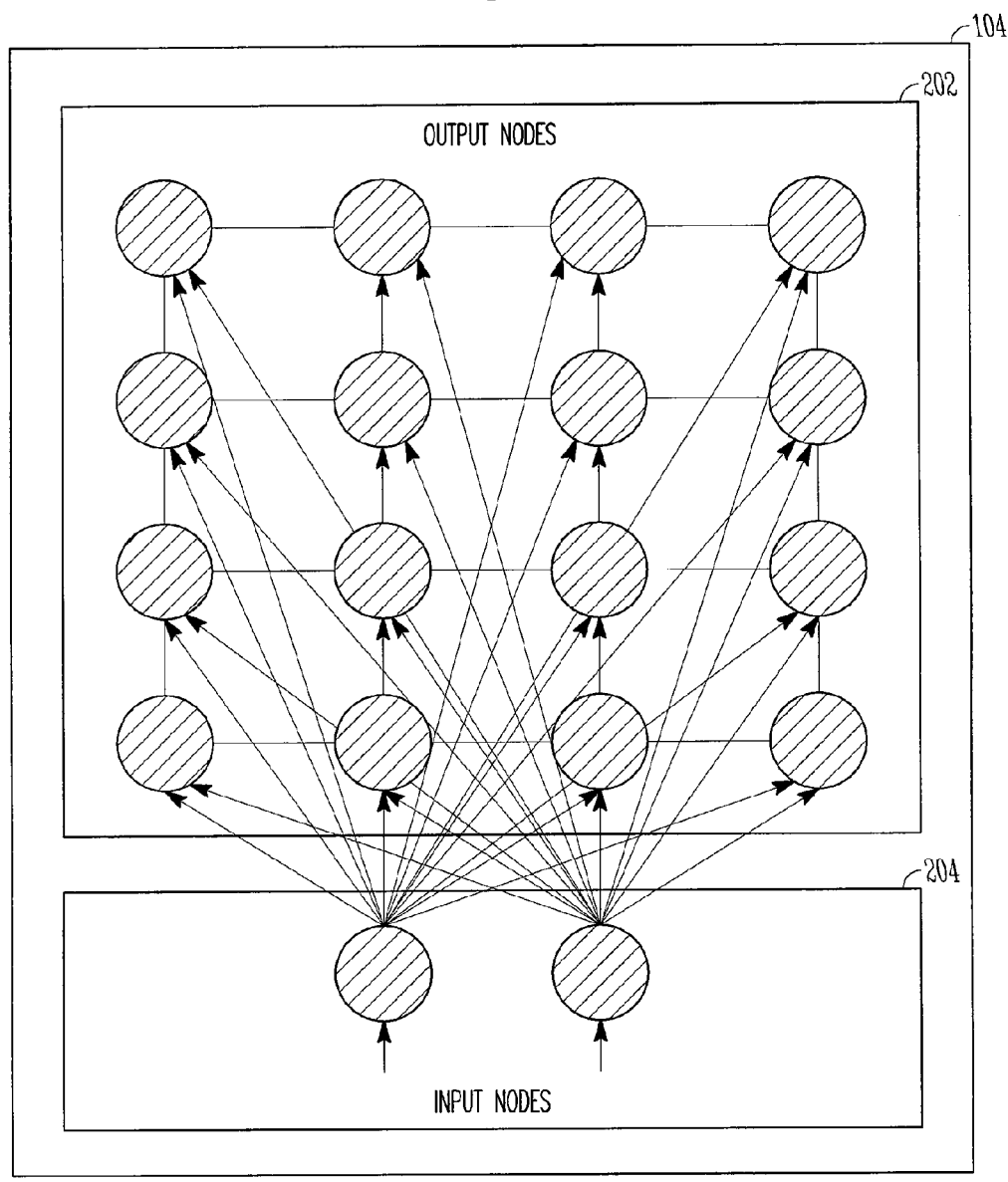
FIG. 2 is a more detailed block diagram of the processing modules of the example system shown in FIG. 1.

FIG. 2 is a more detailed block diagram of the processing modules of FIG. 1. As shown in FIG. 2, the processing modules 104 comprise input nodes 204 and output nodes 202. The input nodes 204 and output nodes 202 may be configured as an unsupervised neural network. In the example embodiment shown in FIG. 2, the unsupervised neural network is a Kohonen network. However, embodiments of the invention are not limited to Kohonen networks and may be any unsupervised neural network.

The input nodes 204 may comprise any number of input nodes. The number of inputs may be variable depending upon how many different types of data are available for the account holder. The number of input nodes could be as few as one or two as shown in FIG. 2 or as many as millions of input nodes. The input values may be binary data or non-binary numeric data (e.g. account balance, age, number of late payments, and so on).

The connections between the inputs and the outputs (shown as lines in FIG. 2) correlate the inputs to the outputs. The connections may be initialized to random weights. The inputs are multiplied by the connection weights and the result is compared to a threshold value. The weights may be modified with temporal progressions.

The output nodes 202 fire when a threshold value is reached. Firing means that the output is passed through to a next state. In operation, the firing of output nodes transforms input data into a meaningful topology. Embodiments of the invention are not limited to any particular number of output nodes. The number of output nodes determines the granularity of the classification of the input data. The more output nodes, then the more clusters in the topology.

In an example embodiment, the output nodes 202 create a topology that may be used to identify potential credit card fraud. The topology created may indicate a classification that a credit card holder falls in most frequently. If the topology changes over time, then the classification that the credit card holder falls into may also change. If the classification changes abruptly, then fraud may be present.

Consider for example, a person who has a credit card history of only buying DVDs and then one month, all of a sudden the person buys a computer and stereo on their card. If the change in purchasing habits from DVDs to expensive electronics moves the person into a different classification, then the change may indicate potential fraud. By recognizing how a credit card holder uses their credit card and identifying changes in the typical use of the card, a financial institution may identify activity that is likely to be fraud.

Methods.

In this section, particular methods of example embodiments are described by reference to a series of flow charts. The methods to be performed constitute computer programs made up of computer-executable instructions.

Figure 3:
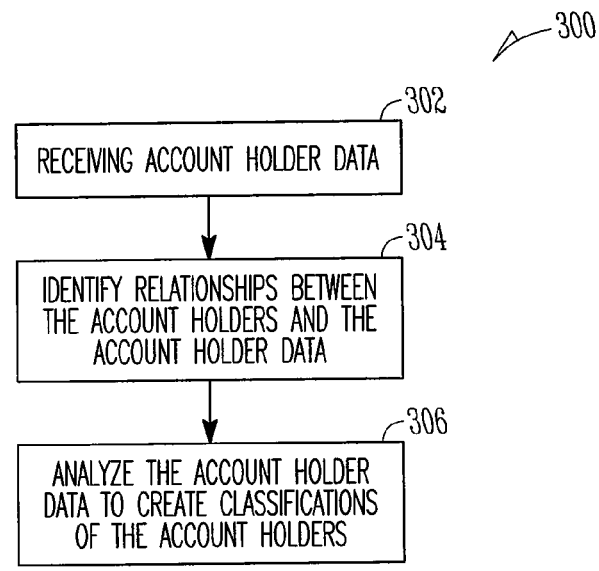
FIG. 3 is a flow diagram illustrating a method according to various embodiments.

FIG. 3 is a flow diagram illustrating several methods according to various embodiments of the invention. As shown in FIG. 3, a method 300 of classifying account holders begins with receiving account holder data for a plurality of account holders (block 302). Relationships are identified through computer automated operations between the plurality of account holders and the account holder data (block 304). The account holder data is analyzed to create one or more classifications of the account holders based on the relationships between the plurality of account holders and the account holder data (block 306). In one embodiment, the computer automated operations of method 300 shown in FIG. 3 are performed using an unsupervised neural network such as a Kohonen network.

Figure 4:
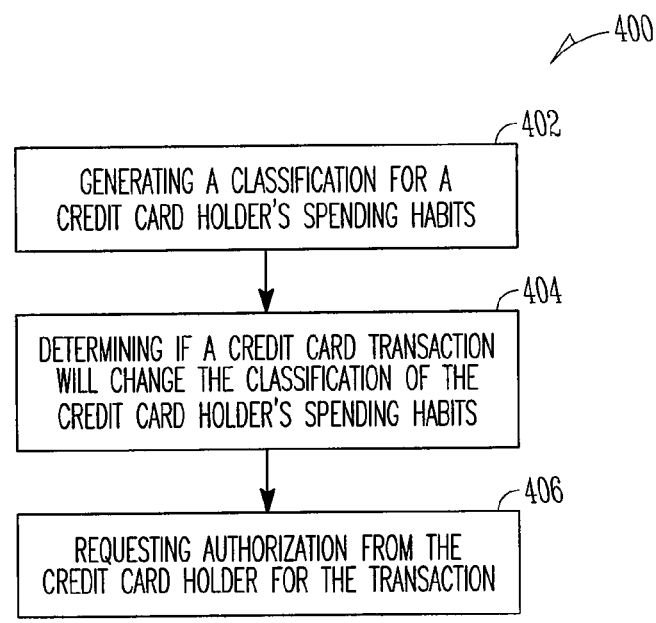
FIG. 4 is a flow diagram illustrating an alternative method according to various embodiments.

FIG. 4 is a flow diagram illustrating an alternate method according to various embodiments of the invention. As shown in FIG. 4, the method 400 of identifying potential credit card fraud, the method begins by generating a classification for a credit card holder's spending habits (402). Then the method determines if a credit card transaction will change the classification of the credit card holder's spending habits (404). If the credit card transaction will change the classification, then authorization from the credit card holder for the transaction may be requested (406) either in an automated way or a manual way.

The method 400 further comprises receiving initial credit card holder data for a plurality of credit card holders, creating at least two initial clusters for the plurality of credit card holders using the initial credit card holder data, receiving additional credit card holder data for the plurality of credit card holders, the additional credit card holder data representing a different time period than the initial credit card holder data, creating at least two additional clusters for the plurality of credit card holders using the additional credit card holder data; and comparing the at least two initial clusters with the at least two additional clusters to identify changes in the spending habits of an individual one of the plurality of credit card holders.

Figure 5:
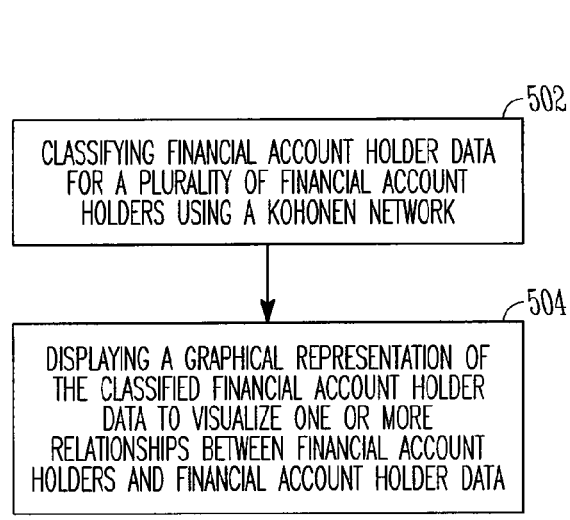
FIG. 5 is a flow diagram illustrating another method according to various embodiments.

FIG. 5 is a flow diagram illustrating a further method according to various embodiments of the invention. As shown in FIG. 5, a method 500 of mining financial account holder data begins by classifying financial account holder data for a plurality of financial account holders using a Kohonen network (block 502). A graphical representation of the classified account holder data is displayed to visualize one or more relationships between plurality of financial account holders and the financial account holder data (block 504).

In one embodiment, the graphical representation of the classified financial account holder data may be displayed as one or more clusters representing the one or more relationships. In some embodiments, the one or more in clusters may be displayed for different points or periods in time to represent changes in the one or more relationships over time. A change in the one or more relationships over time may be an indicator of potentially fraudulent account activity.

In another embodiment, the graphical representation of the classified financial account holder data may be displayed as a 3-dimensional topology representing the one or more relationships. In still another embodiment, the graphical representation may be analyzed to identify common characteristics between individual ones of the plurality of financial account holders. In yet another embodiment, the classified financial account holder data may be analyzed to identify additional services to market to individual ones of the financial account holders.

It may be possible to execute the activities described herein in an order other than the order described. And, various activities described with respect to the methods identified herein can be executed in repetitive, serial, or parallel fashion.

Hardware and Operating Environment.

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 6 below.

Figure 6:
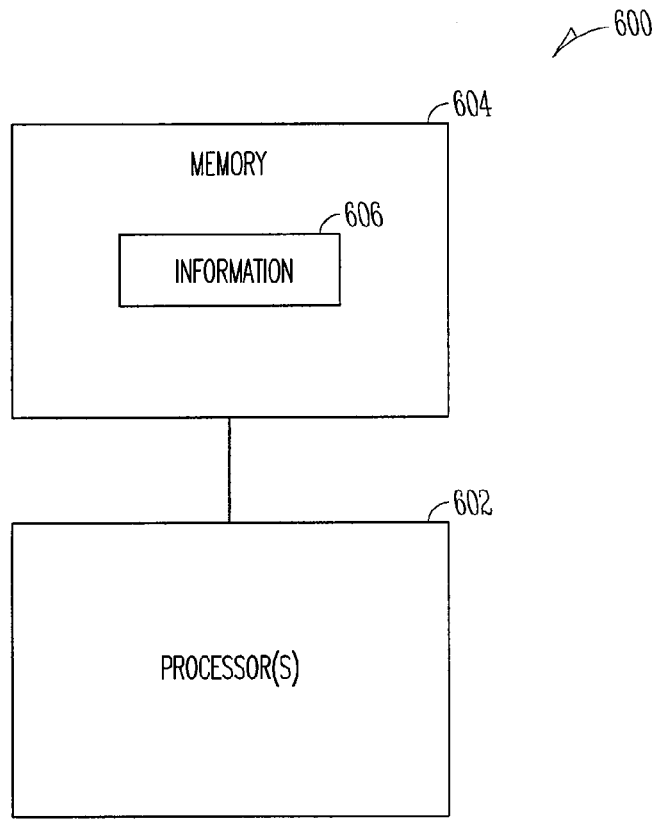
FIG. 6 is a block diagram of an article according to various embodiments.

FIG. 6 is a block diagram of an article 600 according to various embodiments of the invention. Such embodiments may comprise a computer, a memory system, a magnetic or optical disk, some other storage device, or any type of electronic device or system. The article 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 602) performing the activities previously described herein.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. An article including a non-transitory storage medium comprising computer-executable instructions to cause at least one processor to perform activities, comprising:
   inputting financial account holder data associated with a kohonen network, the financial account holder data corresponding to a plurality of financial account holders and the kohonen network implemented using at least one of an electronic circuit or a set of programmatic instructions executing on a computer;
   classifying the financial account holder data by propagating the financial account holder data through the kohonen network and identifying clusters of output nodes, each cluster corresponding to at least one classification;
   classifying a first of the plurality of financial account holders into a first spending history classification;
   classifying a second of the plurality of financial account holders into a second spending history classification;
   storing resulting classified financial account holder data, the first spending history, classification of the first of the plurality of financial account holders, and the second spending history classification of the second of the plurality of financial account holders in a memory device;
   displaying a graphical representation of the classified financial account holder data to visualize one or more relationships between the plurality of financial account holders and the financial account holder data; and
   identifying potentially fraudulent credit card account activity based upon a change by the first of the plurality of financial account holders from the first spending history classification to the second spending history classification.

2. The article of claim 1, further comprising computer-executable instructions to cause the at least one processor to perform activities, including:
   displaying at least one of the clusters of output nodes to represent the one or more relationships.

3. The article of claim 1, further comprising computer-executable instructions to cause the at least one processor to perform activities, including:
   displaying a plurality of sets of the clusters of output nodes, each set captured at a point in time different from a time of capture of the other sets, the plurality of sets to represent changes in the one or more relationships over time.

4. The article of claim 1, further comprising computer-executable instructions to cause the at least one processor to perform activities, including:
   displaying a 3-dimensional topology to represent the one or more relationships.

5. The article of claim 1, further comprising computer-executable instructions to cause the at least one processor to perform activities, including:
   analyzing the graphical representation to identify common characteristics between individual ones of the plurality of financial account holders.

6. The article of claim 1, further comprising computer-executable instructions to cause the at least one processor to perform activities, including:
   identifying additional services to market to individual ones of the financial account holders using the classified financial account holder data.

7. A computer implemented method of mining financial account holder data, comprising: using a processor in a system including a computing device with the processor and memory for storing executable instructions that are executable by the processor to perform:
   inputting financial holder data associated with a kohonen network, the financial account holder data corresponding to a plurality of financial account holders and the kohonen network implemented using at least one of an electronic circuit or a set of programmatic instructions executing on a computer;
   classifying the financial account holder data by propagating the financial account holder data through the kohonen network and identifying clusters of output nodes, each cluster corresponding to at least one classification;
   classifying a first of the plurality of financial account holders into a first spending history classification;
   classifying a second of the plurality of financial account holders into a second spending history classification;
   storing resulting classified financial account holder data, the first spending history classification of the first of the plurality of financial account holders, and the second spending history classification of the second of the plurality of financial account holders in a memory device;
   displaying a graphical representation of the classified financial account holder data to visualize one or more relationships between the plurality of financial account holders and the financial account holder data; and
   identifying potentially fraudulent credit card account activity based upon a change by the first of the plurality of financial account holders from the first spending history classification to the second spending history classification.

8. The computer implemented method of claim 7, further comprising:
   displaying one or more of the clusters of output nodes to represent the one or more relationships.

9. The computer implemented method of claim 7, further comprising:
   displaying a plurality of sets of the clusters of output nodes, each set captured at a point in time different from a time of capture of the other sets, the plurality of sets to represent changes in the one or more relationships over time.

10. The computer implemented method of claim 7, further comprising:
    displaying a 3-dimensional topology to represent the one or more relationships.

11. The computer implemented method of claim 7 further comprising:
    analyzing the graphical representation to identify common characteristics between individual ones of the plurality of financial account holders.

12. The computer implemented method of claim 7 further comprising:
    identifying additional services to market to individual ones of the financial account holders using the classified financial account holder data.

13. A system for mining financial account holder data, the system comprising:
    at least one of an electronic circuit or a set of programmatic instructions executing on a computer to classify the financial account holder data by propagating the financial account holder data through a kohonen network, the financial account holder data corresponding to a plurality of financial account holders;
    a subsystem including input nodes associated with the kohonen network to which to input the financial account holder data, classify a first of the plurality of financial account holders into a first spending history classification, classify a second of the plurality of financial account holders into a second spending history classification, and store resulting classified financial account holder data, the first spending history classification of the first of the plurality of financial account holders, and the second spending history classification of the second of the plurality of financial account holders;
    an electronic display to display a graphical representation of the classified financial account holder data and to enable a visualization of one or more relationships between the plurality of financial account holders and the financial account holder data; and
    a fraud subsystem to indicate potential fraudulent credit card activity using a change by the first of the plurality of financial account holders from the first spending history classification to the second spending history classification.

14. The system of claim 13, further comprising:
    a subsystem to display one or more clusters of kohonen network output nodes representing the one or more relationships.

15. The system of claim 13, further comprising:
    a subsystem to display a plurality of sets of the clusters of output nodes, each set captured at a point in time different from a time of capture of the other sets, the plurality of sets to represent changes in the one or more relationships over time.

16. The system of claim 13, further including:
    a subsystem to display a 3-dimensional topology representing the one or more relationships.

17. The system of claim 13, further comprising:
    a subsystem to analyze the graphical representation to identify common characteristics between individual ones of the plurality of financial account holders.

18. The system of claim 13, further comprising:
    a subsystem to identify additional services to market to individual ones of the financial account holders based upon the classified financial account holder data.

* * * * *